United States Patent
Hong et al.

(10) Patent No.: US 12,434,608 B2
(45) Date of Patent: Oct. 7, 2025

(54) ARMREST FOR REAR CENTER SEAT OF VEHICLE

(71) Applicants: HYUNDAI MOTOR COMPANY, Seoul (KR); KIA CORPORATION, Seoul (KR); ADIENT KOREA, INC.

(72) Inventors: Suk Won Hong, Bucheon-si (KR); Sang Hyeok Yun, Ulsan (KR); Jong Seok Han, Suwon-si (KR); Gil Ju Kim, Hwaseong-si (KR); Sang Man Seo, Suwon-si (KR); Heung Suk Yang, Ansan-si (KR); Jae Beom Park, Ansan-si (KR); Eu Ddeum Yang, Siheung-si (KR); Ji Hyun Kim, Ansan-si (KR)

(73) Assignees: HYUNDAI MOTOR COMPANY, Seoul (KR); KIA CORPORATION, Seoul (KR); ADIENT KOREA, INC., Asan-si (KR)

( * ) Notice: Subject to any disclaimer, the term of this patent is extended or adjusted under 35 U.S.C. 154(b) by 165 days.

(21) Appl. No.: 18/200,170

(22) Filed: May 22, 2023

(65) Prior Publication Data

US 2024/0190316 A1    Jun. 13, 2024

(30) Foreign Application Priority Data

Dec. 9, 2022  (KR) .................. 10-2022-0171056

(51) Int. Cl.
*B60N 2/75* (2018.01)
*B60N 3/10* (2006.01)

(52) U.S. Cl.
CPC ............. *B60N 2/757* (2018.02); *B60N 2/793* (2018.02); *B60N 3/102* (2013.01)

(58) Field of Classification Search
CPC .......... B60N 2/757; B60N 2/75; B60N 2/793; B60N 3/102; B60N 3/101
See application file for complete search history.

(56) References Cited

U.S. PATENT DOCUMENTS

| | | | | |
|---|---|---|---|---|
| 5,275,779 A * | 1/1994 | Marfilius | ............... | B60N 2/757 264/278 |
| 7,775,584 B2 * | 8/2010 | Hughes, Jr | ............... | B60N 2/78 296/187.05 |
| 9,162,597 B2 * | 10/2015 | Charles | ................... | B60N 2/767 |
| 10,131,262 B2 * | 11/2018 | Karges | ................... | B60N 3/101 |

* cited by examiner

*Primary Examiner* — Paul N Dickson
(74) *Attorney, Agent, or Firm* — MCDONNELL BOEHNEN HULBERT & BERGHOFF LLP

(57) ABSTRACT

An armrest for a rear center seat of a vehicle includes a foam pad for the rear armrest and a convenience device mounted in the foam pad. The foam pad has formed therein a concave portion configured to induce deformation due to impact and distribute load at a portion in contact with the convenience device so as to satisfy the static strength test on a center headrest for the rear center seat, and at the same time, improve comfort of a passenger seated on the rear center seat.

10 Claims, 9 Drawing Sheets

Prior Art

Prior Art

Prior Art

ARMREST FOR REAR CENTER SEAT OF VEHICLE

CROSS REFERENCE TO RELATED APPLICATIONS

This application claims, under 35 U.S.C. § 119(a), the benefit of and priority to Korean Patent Application No. 10-2022-0171056, filed on Dec. 9, 2022, the entire contents of which are incorporated herein by reference.

BACKGROUND

(a) Technical Field

The present disclosure relates to an armrest for a rear center seat of a vehicle. More particularly, the disclosure to an armrest for a rear center seat of a vehicle, the armrest being capable of satisfying the static strength test on a center headrest for the rear center seat, and at the same time, improving comfort of a passenger seated on the rear center seat.

(b) Background Art

Generally, a rear seat for a vehicle includes a rear center seat disposed between a left rear seat and a right rear seat in addition to the left and right rear seats, so that three passengers may sit on the rear seat.

The rear center seat includes, as illustrated in FIG. 1, a center seatback 10 on which a passenger may lean his or her upper body, a center headrest 20 configured to support the head of the passenger, and a rear armrest 30 rotatably mounted to the center seatback 10.

The rear armrest 30 may be rotated from a storage space 11 in the center seatback 10 to a position where a passenger uses the same as an armrest or the like. Whereas, when the rear armrest 30 is inserted into the storage space 11 in the center seatback 10, the rear armrest 30 serves as a seatback to support the upper body of a passenger.

The rear armrest has an inner portion having a foam pad embedded therein so as to provide a sense of comfort and a shock absorbing buffer when the upper body of a passenger is supported.

However, because convenience devices such as a cup holder, a control box, and a tray are mounted in the rear armrest, the thickness and area of the foam pad inevitably decrease as much as the space occupied by the convenience devices, and thus shock absorbing and buffering power for the load of the passenger's upper body decrease.

As a result, due to the convenience devices mounted in the rear armrest, seating comfort for the passenger on the rear center seat decreases compared to the seating comfort on the left and right rear seats.

Meanwhile, a static strength test is conducted for the center headrest of the rear center seat.

The static strength test for the center headrest is a compulsory regulation, and the static strength of the center headrest stipulated by law must be satisfied.

The process of the static strength test on the center headrest is as follows.

FIG. 2 is a schematic view illustrating a method of testing the static strength of a center headrest mounted on a center seatback (e.g., a type without a rear armrest) of a rear center seat.

When a body panel 110, which is a passenger's upper body dummy, and a head panel 120, which is a passenger's head dummy, are tilted and moved towards the rear center seat by the operation of test equipment 100, the body panel 110 first touches the center seatback 10 and then presses the center seatback 10 with a predetermined load.

Because the center seatback 10 is a type without a rear armrest, a first foam pad 12 having a predetermined thickness or greater may be embedded therein.

Accordingly, when the body panel 110 presses the center seatback 10 with a predetermined load, the first foam pad 12 inside the center seatback 10 may be deformed to the maximum extent while absorbing the load.

In other words, when the body panel 110 presses the center seatback 10, which is the type without a rear armrest, with a predetermined load, the first foam pad 12 inside the center seatback 10 may be maximally shrink-deformed while absorbing the load.

When the center seatback 10 is pressed with a predetermined load, the body panel 110 is further moved by the shrink-deformed thickness of the first foam pad 12, and the head panel 120 is moved together therewith. Accordingly, the distance from the head panel 120 to the center headrest 20 decreases, and thus the distance therebetween may be maintained small as a first distance L1.

Thereafter, by the operation of an actuator 121, the head panel 120 may hit the center headrest 20 with a predetermined load, thereby displacing the center headrest 20.

Subsequently, the amount of displacement of the center headrest 20 is measured using a general measuring device, and the measured displacement of the center headrest 20 is compared with a reference value.

When the measured displacement of the center headrest 20 is less than or equal to the reference value as a result of the comparison, it is determined that the static strength regulation on the center headrest is satisfied.

As such, in the case of the center seatback 10 without a rear armrest, the first foam pad 12 in the center seatback may shrink and deform to the maximum extent while absorbing the load of the body panel 110, and accordingly, the first distance L1 from the head panel 120 to the center headrest 20 may be maintained as close as possible. For this reason, even if the head panel 120 hits the center headrest 20 with a predetermined load, the amount of displacement of the center headrest 20 may satisfy the reference value or less.

FIG. 3 is a schematic view illustrating a method of testing the static strength of a center headrest mounted on a center seatback (e.g., a type having a rear armrest) of a rear center seat.

When a body panel 110, which is a passenger's upper body dummy, and a head panel 120, which is a passenger's head dummy, are tilted and moved towards the rear center seat by the operation of test equipment 100, the body panel 110 first touches a center seatback 10 and then presses a rear armrest 30 of the center seatback 10 with a predetermined load.

Accordingly, when the body panel 110 presses the rear armrest 30 of the center seatback 10 with a predetermined load, a second foam pad 32 inside the rear armrest 30 may be deformed while absorbing the load.

However, because convenience devices such as a cup holder, a control box, and a tray are mounted in the rear armrest 30, the thickness and area of the second foam pad 32 inevitably decrease as much as the space occupied by the convenience devices. Accordingly, the shrinkage deformation of the second foam pad 32 due to the load of the body panel 110 is inevitably smaller than that of the first foam pad 12 of the center seatback 10, which is the type without the rear armrest described above.

For this reason, when the body panel 110 presses the rear armrest 30 with a predetermined load and moves further by the shrink-deformed thickness of the second foam pad 32, even if the head panel 120 is moved together therewith, the distance from the head panel 120 to the center headrest 20 is maintained at a second distance L2 that is greater than the first distance L1.

Thereafter, by the operation of an actuator 121, the head panel 120 may hit the center headrest 20 with a predetermined load, thereby displacing the center headrest 20.

However, even if the head panel 120 hits the center headrest 20 with the same amount of force in the state in which the distance between the head panel 120 and the center headrest 20 is maintained at the second distance L2, greater than the first distance L1, the displacement of the center headrest 20 inevitably increases beyond the reference value, thereby failing to satisfy the static strength regulation on the center headrest, and thus failing the static strength test on the center headrest.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide an armrest for a rear center seat of a vehicle, the armrest including a foam pad for the rear armrest and a convenience device mounted in the foam pad, wherein the foam pad has formed therein a concave portion, configured to induce deformation due to impact and distribute load, at a portion in contact with the convenience device so as to satisfy the static strength test on a center headrest for the rear center seat, and at the same time, improve comfort of a passenger seated on the rear center seat.

In one aspect, the present disclosure provides an armrest for a rear center seat of a vehicle, the armrest including a foam pad for the rear armrest storable in a center seatback of the rear center seat, and a convenience device mounted in the foam pad. Here, the foam pad may have formed therein concave portions, configured to induce deformation of the foam pad for shock absorption and distribute a load, at a portion in contact with the convenience device.

In a preferred embodiment, the concave portions each may have a circular or polygonal cross-section structure having a predetermined diameter and depth.

In another preferred embodiment, the concave portions may be formed in the bottom portion of a convenience device mounting space formed in one surface portion of the foam pad.

In still another preferred embodiment, when a cup holder of the convenience device is inserted into the convenience device mounting space, the concave portions may be formed in an array of one row at predetermined intervals at the bottom portion of the convenience device mounting space in contact with the lower portion of the cup holder. Here, the concave portions each may have a circular depressed structure or a polygonal depressed structure.

In yet another preferred embodiment, when a cup holder combined tray, having a larger area than the cup holder, of the convenience device is inserted into the convenience device mounting space, the concave portions may be formed in an array of two or more rows at predetermined intervals at the bottom portion of the convenience device mounting space in contact with the lower portion of the tray. Here, the concave portions each may have a circular depressed structure or a polygonal depressed structure.

In still yet another preferred embodiment, the foam pad may have an inner portion into which an armrest frame is inserted during molding of the foam pad.

In a further preferred embodiment, the armrest frame may include a first frame inserted in a widthwise direction at a front side of a convenience device mounting space in the foam pad, and a pair of second frames extending rearwards from opposite ends of the first frame and inserted in a lengthwise direction of the foam pad.

In another further preferred embodiment, the armrest may further include a cover member configured to cover the outer surface of the foam pad.

Other aspects and preferred embodiments of the disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
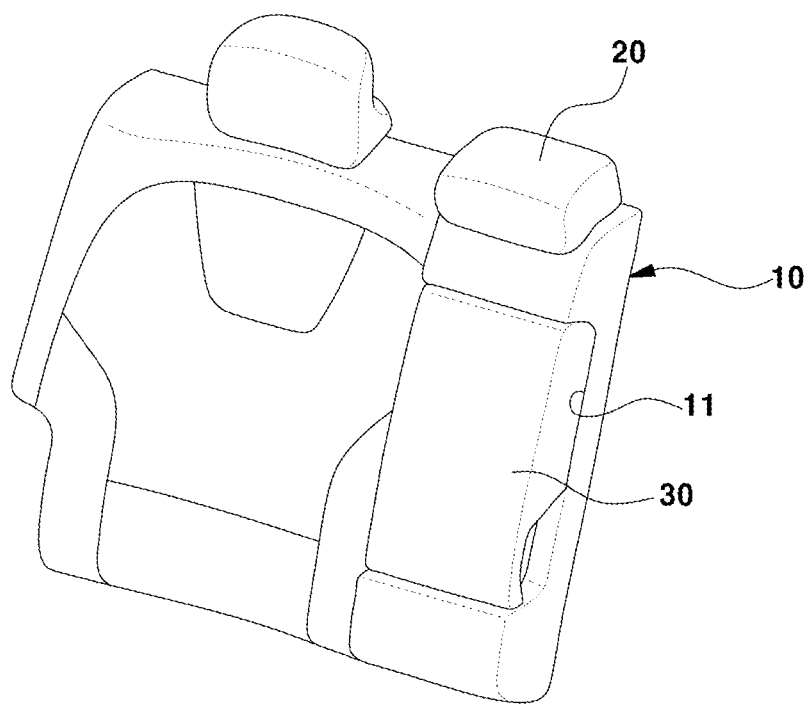
FIG. 1 is a schematic view illustrating a rear center seat.
Figure 2:
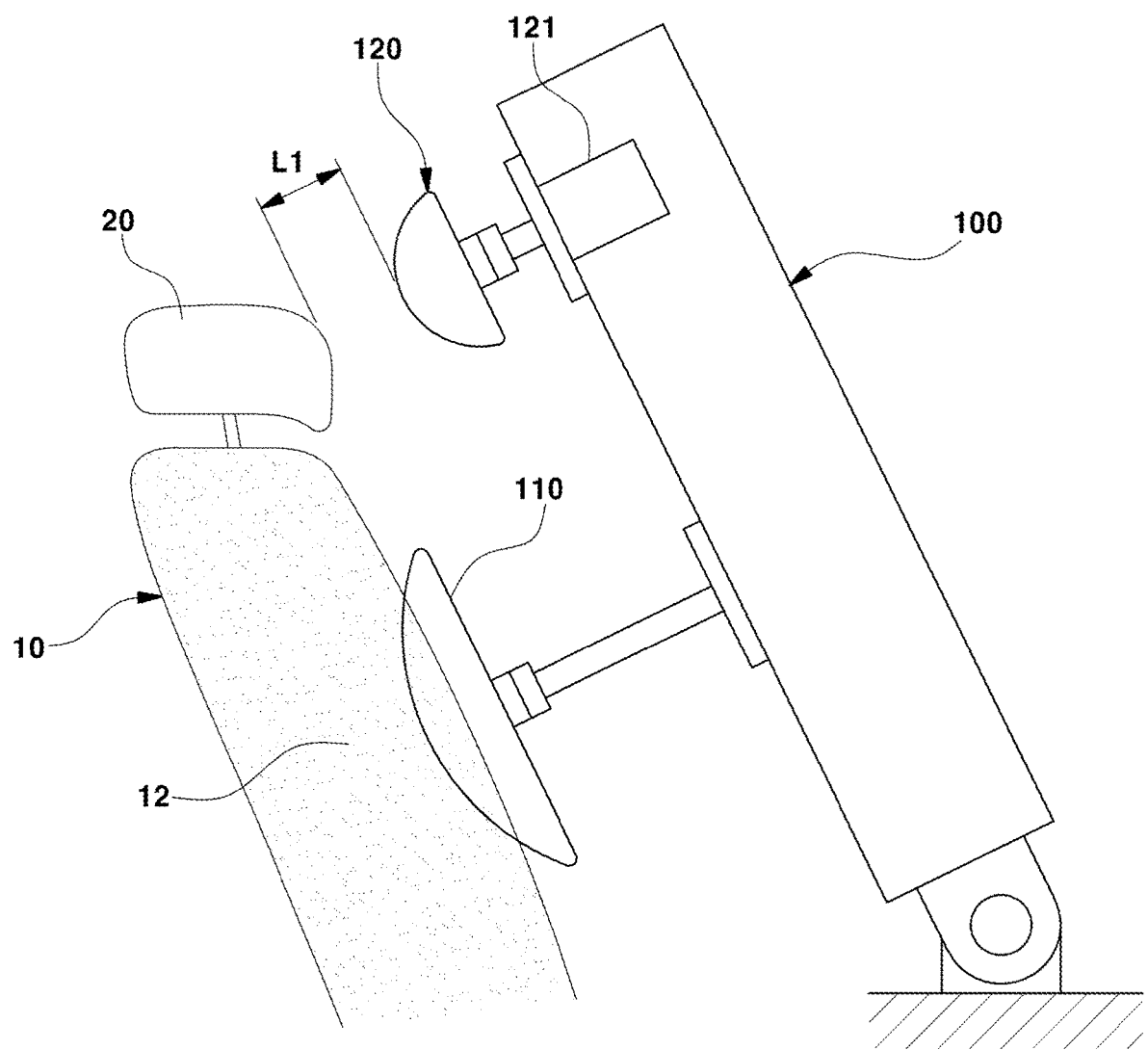
FIGS. 2 and 3 are schematic views illustrating a method of testing the static strength of a center headrest mounted on a center seatback of a rear center seat.
Figure 3:
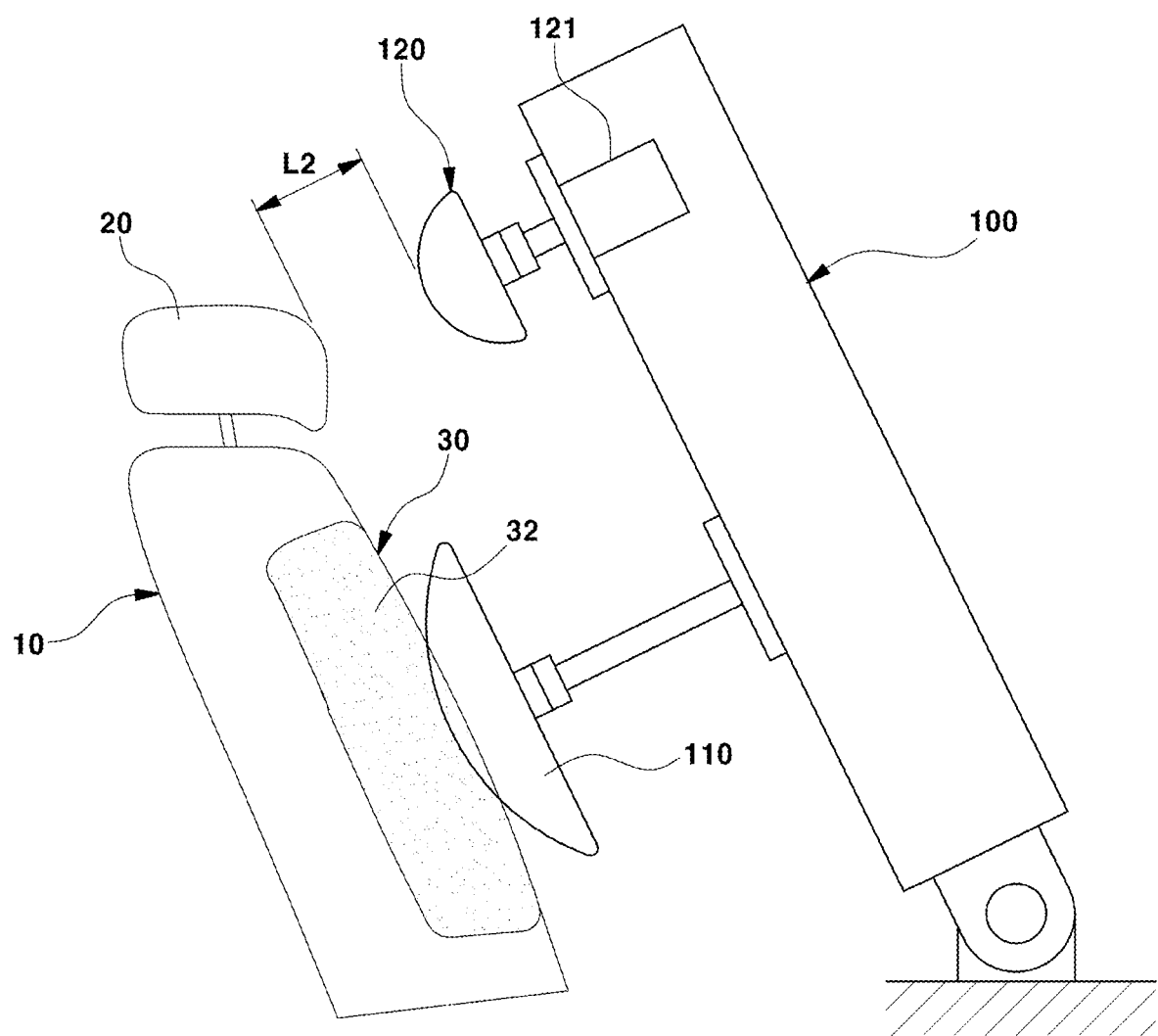

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and usage environment.

In the figures, reference numbers refer to the same or equivalent parts of the present disclosure throughout the several figures of the drawing.

DETAILED DESCRIPTION

Hereinafter, preferred embodiments of the present disclosure will be described with reference to the accompanying drawings.

Figure 4:
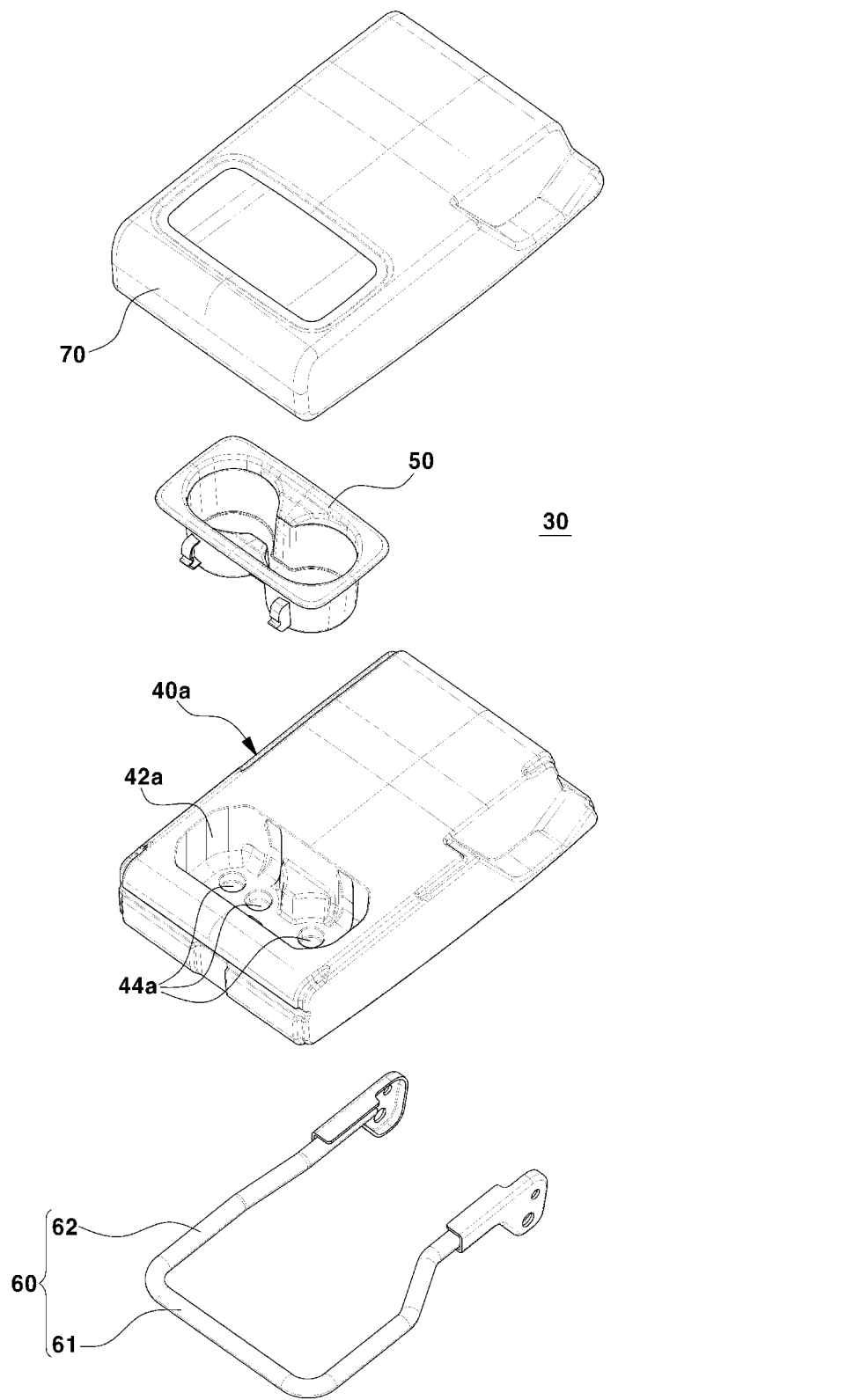
FIG. 4 is an exploded perspective view illustrating an armrest for a rear center seat of a vehicle according to one embodiment of the present disclosure.
Figure 5:
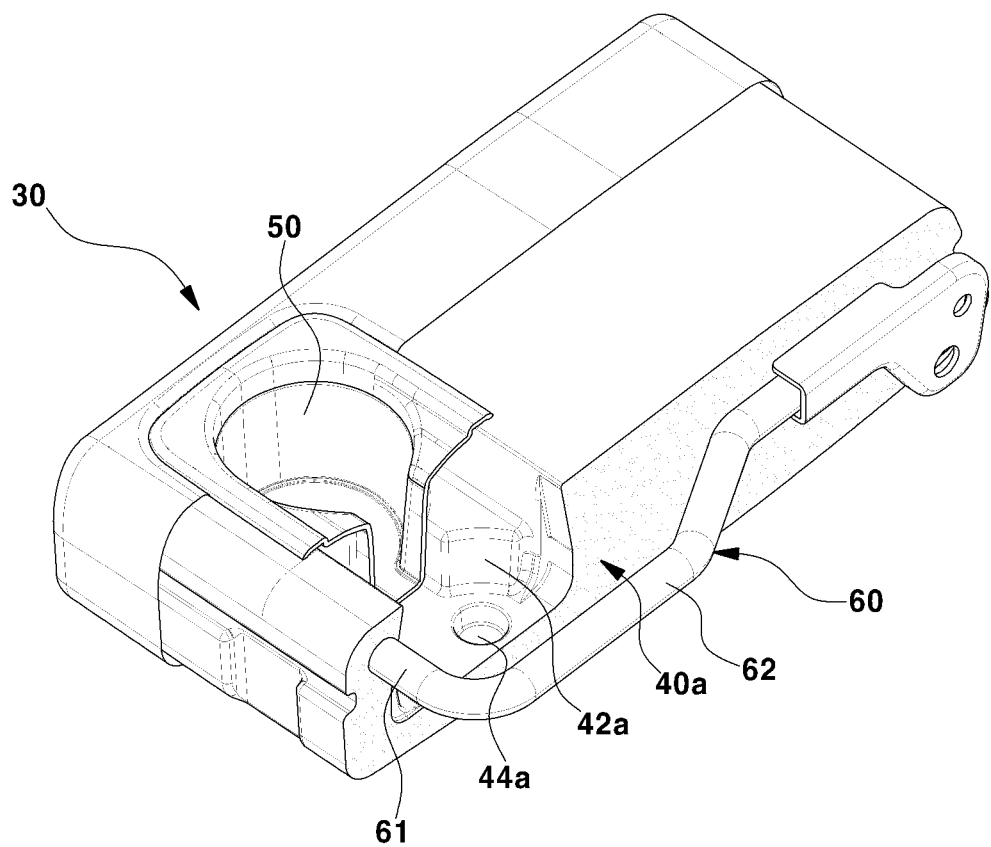
FIG. 5 is a partial cross-sectional perspective view illustrating an armrest for a rear center seat of a vehicle according to one embodiment of the present disclosure.
Figure 6:
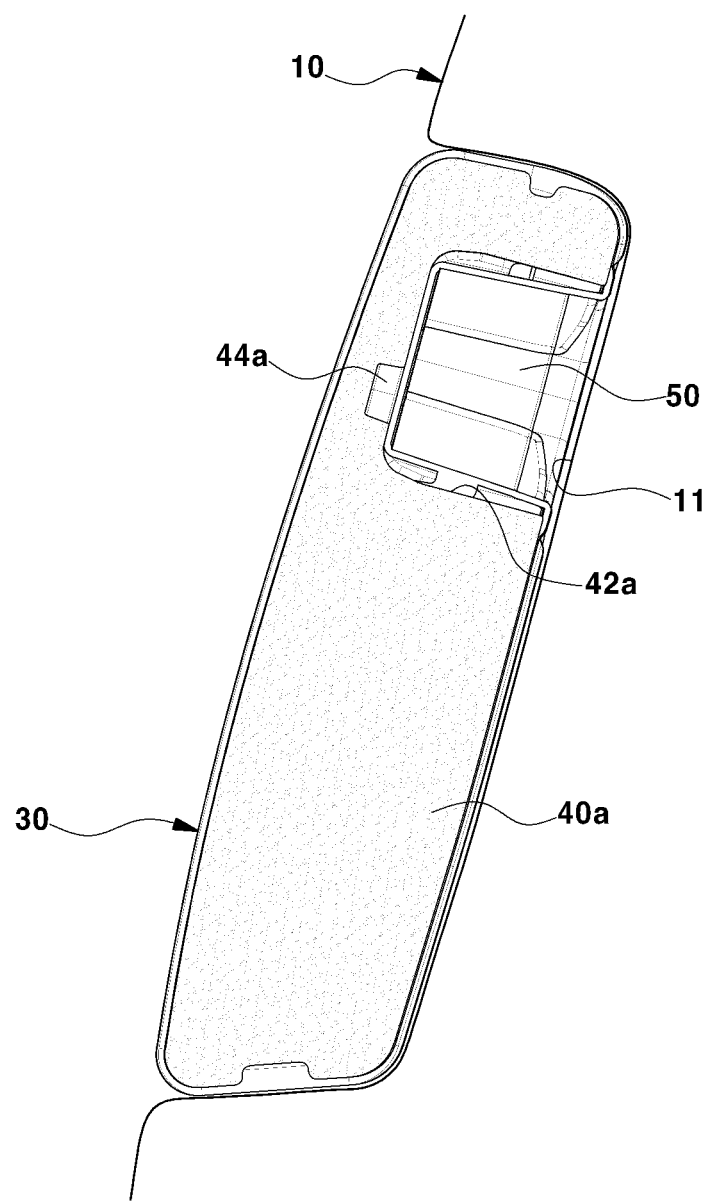
FIG. 6 is a cross-sectional view illustrating an armrest for a rear center seat of a vehicle according to one embodiment of the present disclosure.

FIGS. 4, 5, and 6 are views illustrating an armrest for a rear center seat of a vehicle according to one embodiment of the present disclosure. In each drawing, reference numeral 30 denotes a rear armrest.

The rear armrest 30 may be rotated from a storage space 11 formed in a center seatback 10 of a rear center seat to a position where a passenger uses the same as an armrest or the like. Whereas, when the rear armrest 30 is inserted into the storage space 11 in the center seatback 10, the rear armrest 30 serves as a seatback to support the upper body of a passenger.

The rear armrest 30 has an inner portion having a foam pad 40a embedded therein so as to provide a sense of comfort and a shock absorbing buffer when the upper body of a passenger is supported.

According to one embodiment of the present disclosure, the foam pad 40a of the rear armrest 30 has one surface having formed therein a convenience device mounting space 42a into which a cup holder 50 of the convenience device is inserted.

According to one embodiment of the present disclosure, the foam pad 40a has formed therein concave portions 44a, configured to induce deformation of the foam pad for shock absorption and distribute a load, at a portion in contact with the cup holder 50.

More specifically, the concave portions 44a are formed in the bottom portion of the convenience device mounting space 42a formed in the one surface of the foam pad 40a, and each have a cross-section structure having a predetermined diameter and depth so as to allow deformation for shock absorption and the load to be evenly distributed.

When the cup holder 50 of the convenience device is inserted into the convenience device mounting space 42a in the foam pad 40a, the concave portions 44a according to one embodiment of the present disclosure may be formed in an array of one row at predetermined intervals at the bottom portion of the convenience device mounting space 42a in contact with the lower portion of the cup holder 50.

More specifically, when the cup holder 50 having two cup insertion holes 52 is inserted into the convenience device mounting space 42a in the foam pad 40a, the concave portions 44a according to one embodiment of the present disclosure may be formed in an array of one row at predetermined intervals at the bottom portion of the convenience device mounting space 42a. Here, two concave portions 44a may be formed at a portion where the lower portion of each of the two cup insertion holes 52 is in contact with the bottom portion of the convenience device mounting space 42a, and a total of four concave portions 44a may be arranged in a row at predetermined intervals at the bottom portion of the convenience device mounting space 42a.

The concave portions 44a according to one embodiment of the present disclosure, arranged in a row at predetermined intervals at the bottom portion of the convenience device mounting space 42a, each may have a circular depressed structure or a polygonal depressed structure.

According to one embodiment of the present disclosure, during molding of the foam pad 40a having formed therein the convenience device mounting space 42a into which the cup holder 50 is inserted, an armrest frame 60 is inserted into the foam pad 40a.

During the molding of the foam pad 40a having formed therein the convenience device mounting space 42a into which the cup holder 50 is inserted, the armrest frame 60 may include a first frame 61 inserted in a widthwise direction at a front side of the convenience device mounting space 42a, and a pair of second frames 62 extending rearwards from opposite ends of the first frame 61 and inserted in a lengthwise direction of the foam pad 40a.

Accordingly, the armrest frame 60 serves as a skeleton of the foam pad 40a so that the foam pad 40a has a predetermined level of strength or higher. In addition, when a load is applied to the foam pad 40a, the armrest frame 60 not only prevents the foam pad 40a from being twisted left and right but also guides the load applied to the foam pad 40a to the concave portions 44a, formed at the bottom portion of the convenience device mounting space 42a in contact with the lower portion of the cup holder 50.

Meanwhile, the outer surface of the foam pad 40a is covered with a cover member 70 made of the same material as that of the seat cover, and the cover member 70 covers the entire surface of the foam pad 40a except for the convenience device mounting space 42a into which the cup holder 50 is inserted.

In a state in which the rear armrest 30 according to one embodiment of the present disclosure manufactured as described above is inserted into the storage space 11 in the center seatback 10 and stored therein as illustrated in FIG. 6, the rear armrest 30 may serve as a seatback to support the upper body of a passenger.

Accordingly, when a passenger seated on the rear center seat leans his or her upper body against the rear armrest 30, the concave portions 44a in the foam pad 40a are deformed to distribute the load of the passenger, thereby improving comfort of the passenger seated on the rear center seat.

Particularly, during the static strength test on the center headrest of the rear center seat, when the load of the body panel, which is a passenger's upper body dummy, is applied to the rear armrest 30 according to one embodiment of the present disclosure, the peripheral portion of the concave portion 44a in the foam pad 40a collapses and is easily dented, so that the amount of shrinkage deformation of the foam pad 40a may increase.

Subsequently, during the static strength test on the center headrest of the rear center seat, the amount of shrinkage deformation of the foam pad 40a increases due to the load of the body panel, and thus the amount of displacement of the center headrest as the head panel, which is a passenger's head dummy, hits the center headrest may meet the reference value or less, and eventually the center headrest may easily pass the static strength test.

Figure 7:
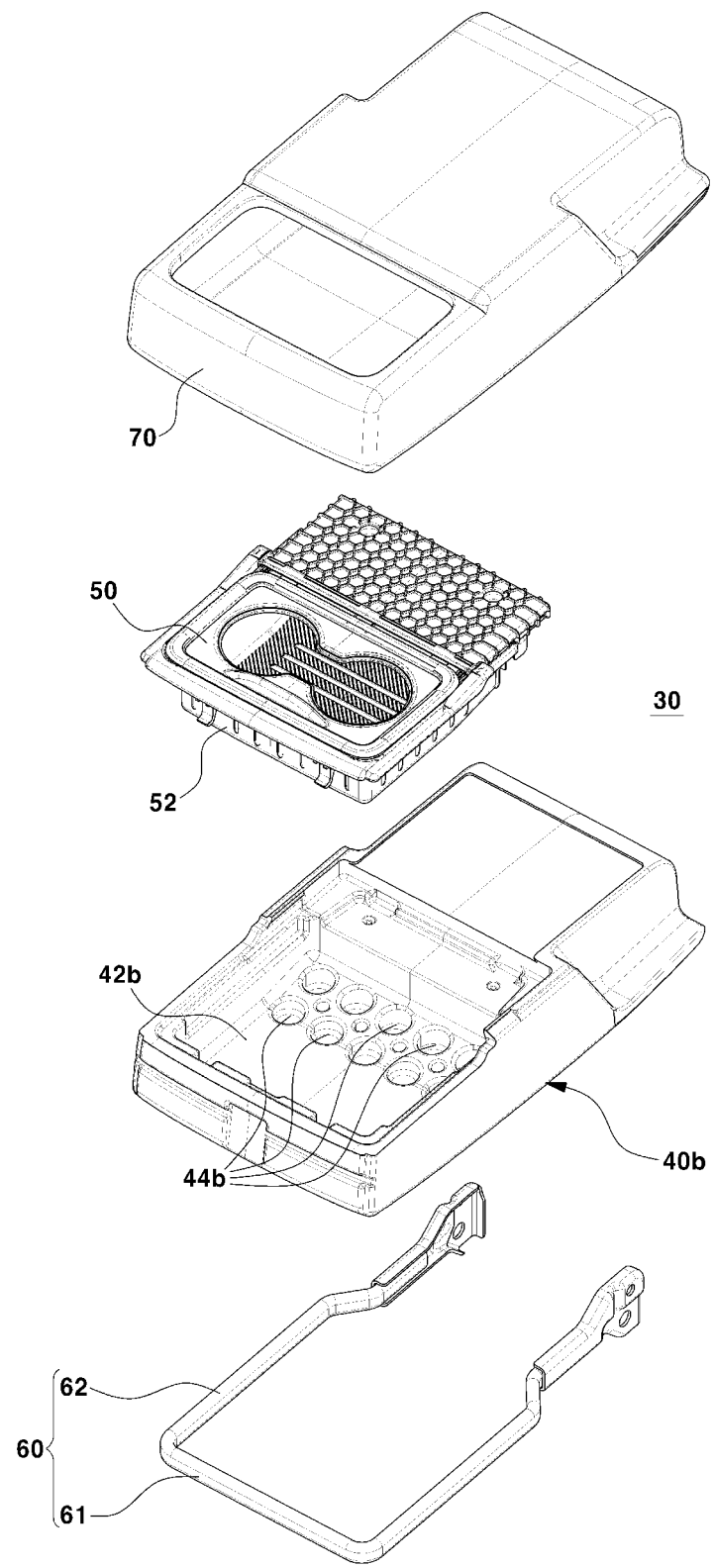
FIG. 7 is an exploded perspective view illustrating an armrest for a rear center seat of a vehicle according to another embodiment of the present disclosure.
Figure 8:
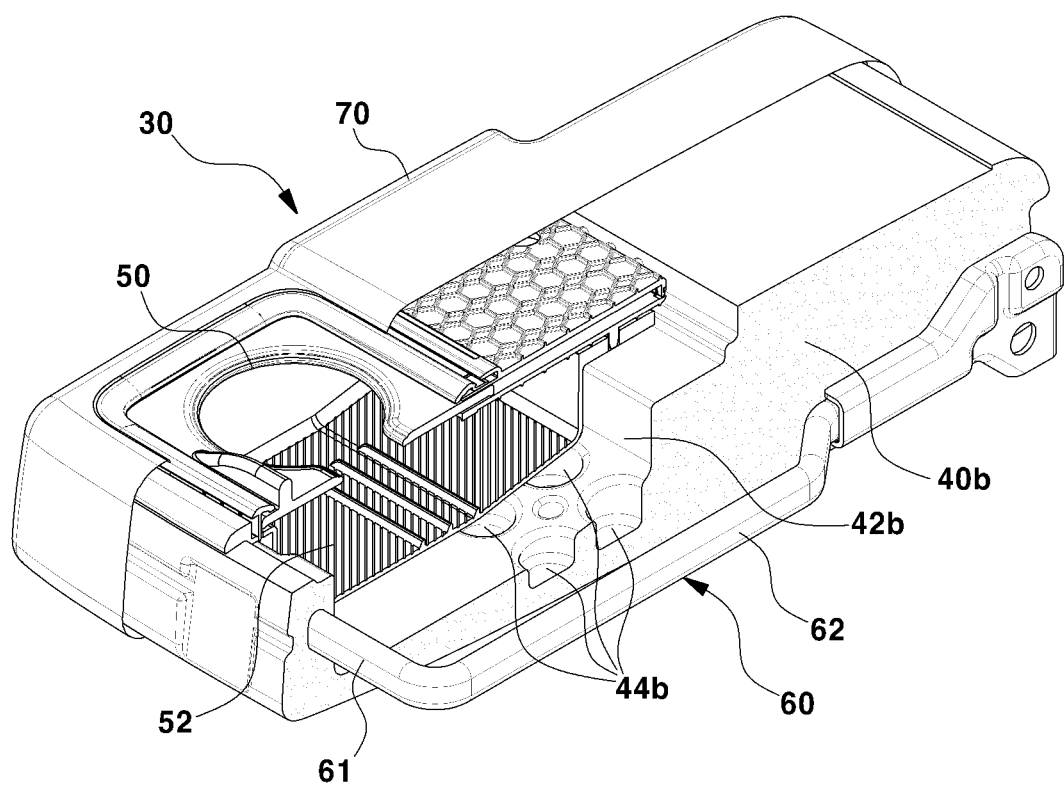
FIG. 8 is a partial cross-sectional perspective view illustrating an armrest for a rear center seat of a vehicle according to another embodiment of the present disclosure.
Figure 9:
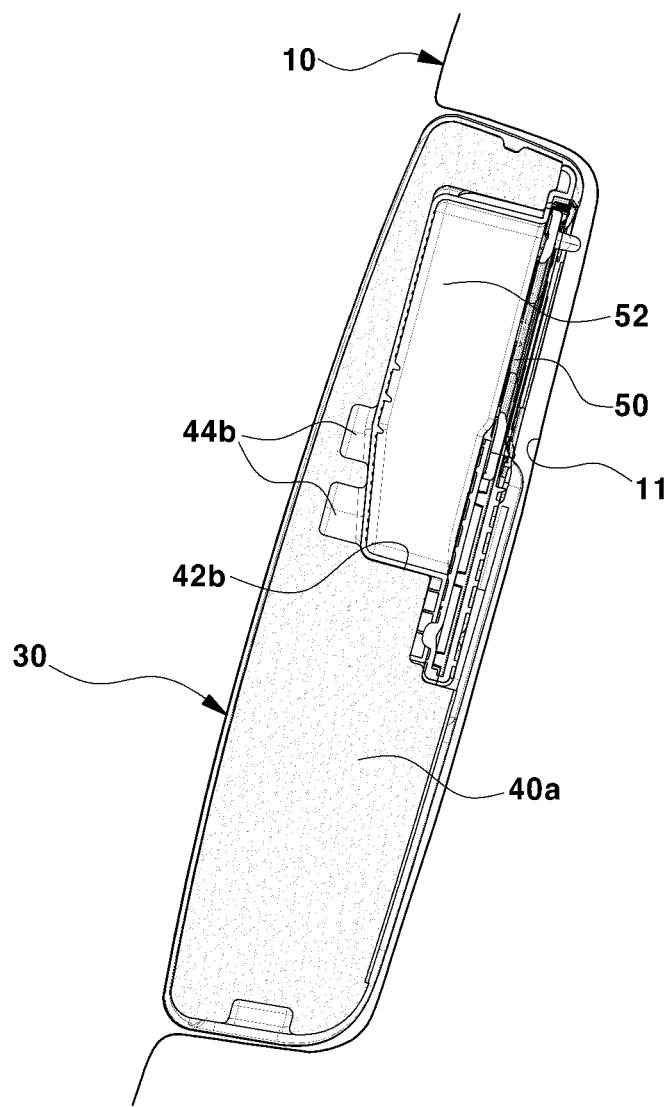
FIG. 9 is a cross-sectional view illustrating an armrest for a rear center seat of a vehicle according to another embodiment of the present disclosure.

FIGS. 7, 8, and 9 are views illustrating an armrest for a rear center seat of a vehicle according to another embodiment of the present disclosure. In each drawing, reference numeral 30 denotes a rear armrest.

According to another embodiment of the present disclosure, a foam pad 40b of the rear armrest 30 has one surface having formed therein a convenience device mounting space 42b into which a tray 52 including the cup holder 50 of the convenience device is inserted.

For example, the tray 52 including the cup holder 50 has a structure in which the tray 52 may be used as a cup holder when the cup holder portion slides forwards, and when the cup holder portion slides rearwards, the tray 52 may be used as a tray to store things.

For this reason, the convenience device mounting space 42b, into which the tray 52 of the foam pad 40b is inserted, has a larger area than the convenience device mounting space 42a according to the one embodiment described above, into which the cup holder is inserted.

According to another embodiment of the present disclosure, the foam pad 40b has formed therein concave portions 44b, configured to induce deformation of the foam pad for shock absorption and distribute a load, at a portion in contact with the tray 52.

More specifically, the concave portions 44b are formed in the bottom portion of the convenience device mounting space 42b formed in the one surface of the foam pad 40b, and each have a cross-section structure having a predetermined diameter and depth so as to allow deformation for shock absorption and the load to be evenly distributed.

When the tray 52 of the convenience device is inserted into the convenience device mounting space 42b in the foam pad 40b, the concave portions 44b according to another embodiment of the present disclosure may be formed in an array of two rows at predetermined intervals at the bottom portion of the convenience device mounting space 42b in contact with the lower portion of the tray 52.

In other words, because the convenience device mounting space 42b, into which the tray 52 of the foam pad 40b is inserted, has a larger area than the convenience device mounting space 42a according to the one embodiment described above, into which the cup holder is inserted, the concave portions 44b according to another embodiment of the present disclosure may be formed in an array of two rows at predetermined intervals at the bottom portion of the convenience device mounting space 42b in contact with the lower portion of the tray 52.

More specifically, when the tray 52 including the cup holder 50 is inserted into the convenience device mounting space 42b in the foam pad 40b, a total of ten concave portions 44b may be formed in a 2×5 array at a portion where the bottom portion of the convenience device mounting space 42b is in contact with the lower portion of the tray 52.

Here, the concave portions 44b according to another embodiment of the present disclosure, arranged in two rows at predetermined intervals at the bottom portion of the convenience device mounting space 42b, each may have a circular depressed structure or a polygonal depressed structure.

According to another embodiment of the present disclosure, during molding of the foam pad 40b having formed therein the convenience device mounting space 42b into which the tray 52 is inserted, an armrest frame 60 is inserted into the foam pad 40b.

During the molding of the foam pad 40b having formed therein the convenience device mounting space 42b into which the tray 52 is inserted, the armrest frame 60 may include a first frame 61 inserted in a widthwise direction at a front side of the convenience device mounting space 42b, and a pair of second frames 62 extending rearwards from opposite ends of the first frame 61 and inserted in a lengthwise direction of the foam pad 40b.

Accordingly, the armrest frame 60 serves as a skeleton of the foam pad 40b so that the foam pad 40b has a predetermined level of strength or higher. In addition, when a load is applied to the foam pad 40b, the armrest frame 60 not only prevents the foam pad 40b from being twisted left and right but also guides the load applied to the foam pad 40b to the concave portions 44b, formed at the bottom portion of the convenience device mounting space 42b in contact with the lower portion of the tray 52.

Meanwhile, the outer surface of the foam pad 40b is covered with a cover member 70 made of the same material as that of the seat cover, and the cover member 70 covers the entire surface of the foam pad 40b except for the convenience device mounting space 42b into which the tray 52 is inserted.

In a state in which the rear armrest 30 according to another embodiment of the present disclosure manufactured as described above is inserted into the storage space 11 in the center seatback 10 and stored therein as illustrated in FIG. 9, the rear armrest 30 may serve as a seatback to support the upper body of a passenger.

Accordingly, when a passenger seated on the rear center seat leans his or her upper body against the rear armrest 30, the concave portions 44b in the foam pad 40b are deformed to distribute the load of the passenger, thereby improving comfort of the passenger seated on the rear center seat.

Particularly, during the static strength test on the center headrest of the rear center seat, when the load of the body panel, which is a passenger's upper body dummy, is applied to the rear armrest 30 according to another embodiment of the present disclosure, the peripheral portion of the concave portion 44b in the foam pad 40b collapses and is easily dented, so that the amount of shrinkage deformation of the foam pad 40b may increase.

Subsequently, during the static strength test on the center headrest of the rear center seat, the amount of shrinkage deformation of the foam pad 40b increases due to the load of the body panel, and thus the amount of displacement of the center headrest as the head panel, which is a passenger's head dummy, hits the center headrest may meet the reference value or less, and eventually the center headrest may easily pass the static strength test.

As is apparent from the above description, the present disclosure provides the following effects.

First, a foam pad for a rear armrest has formed therein a convenience device mounting space, and the convenience device mounting space has formed therein a concave portion, configured to induce deformation due to impact and distribute load, at the bottom portion thereof in contact with a convenience device such as a cup holder or a tray so as to increase the amount of shrinkage deformation of the foam pad due to the load of a body panel during the static strength test on the center headrest, thereby satisfying the static strength regulation on the center headrest.

Second, when a passenger seated on the rear center seat leans his or her upper body against the rear armrest, the concave portions in the foam pad are deformed to distribute the load of the passenger, thereby improving comfort of the passenger seated on the rear center seat.

Although the present disclosure has been described in detail with reference to each embodiment, the scope of the present disclosure is not limited to the above-described embodiment, and various modifications and improvements by those skilled in the art based on the basic concept of the present disclosure as defined in the claims below will also be included in the scope of the present disclosure.

The invention claimed is:

1. An armrest for a rear center seat of a vehicle, the armrest comprising:
   a foam pad configured to be stored in a center seatback of the rear center seat; and a convenience device mounting space positioned within the foam pad;
wherein the convenience device mounting space includes one or more concave portions formed within the foam pad and configured to deform for shock absorption, and to distribute a load at a portion in contact with the convenience device.

2. The armrest according to claim 1, wherein each of the one or more concave portions has a circular or polygonal cross-section structure having a predetermined diameter and depth.

3. The armrest according to claim 1, wherein each of the one or more concave portions is formed in a bottom portion of the convenience device mounting space.

4. The armrest according to claim 3, wherein, when a cup holder of the convenience device is inserted into the convenience device mounting space, the one or more concave portions comprises a plurality of concave portions are-formed in an array of one row at predetermined intervals at the bottom portion of the convenience device mounting space in contact with a lower portion of the cup holder.

5. The armrest according to claim 4, wherein each of the plurality of concave portions has a circular depressed structure or a polygonal depressed structure.

6. The armrest according to claim 3, wherein, when a cup holder combined tray having a larger area than the cup holder of the convenience device is inserted into the convenience device mounting space, the one or more concave portions comprises a plurality of concave portions formed in an array of two or more rows at predetermined intervals at the bottom portion of the convenience device mounting space in contact with a lower portion of the tray.

7. The armrest according to claim 6, wherein each of the plurality of concave portions has a circular depressed structure or a polygonal depressed structure.

8. The armrest according to claim 1, wherein the foam pad has an inner portion into which an armrest frame is inserted during molding of the foam pad.

9. The armrest according to claim 8, wherein the armrest frame comprises a first frame inserted in a widthwise direction at a front side of a convenience device mounting space in the foam pad, and a pair of second frames extending rearwards from opposite ends of the first frame and inserted in a lengthwise direction of the foam pad.

10. The armrest according to claim 1, further comprising a cover member configured to cover an outer surface of the foam pad.

* * * * *